US011338389B2

(12) United States Patent
Shikata

(10) Patent No.: US 11,338,389 B2
(45) Date of Patent: May 24, 2022

(54) BATTERY CASE SEALING METHOD AND A SEALED BATTERY MANUFACTURING METHOD

(71) Applicant: TOYOTA JIDOSHA KABUSHIKI KAISHA, Toyota (JP)

(72) Inventor: Katsuya Shikata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 15/861,211

(22) Filed: Jan. 3, 2018

(65) Prior Publication Data

US 2018/0193952 A1 Jul. 12, 2018

(30) Foreign Application Priority Data

Jan. 11, 2017 (JP) .............................. JP2017-002680

(51) Int. Cl.
*B23K 26/20* (2014.01)
*B23K 26/21* (2014.01)
(Continued)

(52) U.S. Cl.
CPC ............ *B23K 26/206* (2013.01); *B23K 26/03* (2013.01); *B23K 26/21* (2015.10); *B23K 26/28* (2013.01); *B23K 26/32* (2013.01); *B23K 37/0443* (2013.01); *H01M 10/287* (2013.01); *H01M 50/147* (2021.01); *H01M 50/15* (2021.01); *H01M 50/166* (2021.01);
(Continued)

(58) Field of Classification Search
CPC ...... H01M 10/04; H01M 10/287; H01M 2/04; H01M 2/06; H01M 2/08; H01M 10/058; H01M 10/345; H01M 50/103; H01M 50/147; H01M 50/15; H01M 50/166; H01M 50/169; H01M 50/172; H01M 50/183; B23K 26/03; B23K 26/21; B23K 26/32; B23K 26/206; B23K 2101/36; B23K 26/28; B23K 2103/10; B23K 37/0443
See application file for complete search history.

(56) References Cited

U.S. PATENT DOCUMENTS

2015/0194640 A1* 7/2015 Tsukuda ............ H01M 10/0413
429/178

FOREIGN PATENT DOCUMENTS

JP 09007557 A * 1/1997
JP 11-077347 A 3/1999
(Continued)

OTHER PUBLICATIONS

Machine translation of JP-2010238404-A, Okuda et al. (Year: 2010).*

(Continued)

*Primary Examiner* — Mayla Gonzalez Ramos

(57) ABSTRACT

In a battery case sealing method, a lid is fitted to an opening of a battery case, and then a side wall on an inner side of the battery case and a side surface of the lid are brought into contact with each other. The side wall forms the opening. In a state where the side wall on the inner side of the battery case is in contact with the side surface of the lid, a boundary portion between the side wall and the side surface of the lid is welded by irradiating a laser beam in a direction from an outer side of the battery case toward the inner side of the battery case in a thickness direction of the lid.

12 Claims, 6 Drawing Sheets

(51) Int. Cl.
  *B23K 26/28* (2014.01)
  *B23K 37/04* (2006.01)
  *H01M 50/15* (2021.01)
  *H01M 50/147* (2021.01)
  *H01M 50/166* (2021.01)
  *H01M 50/169* (2021.01)
  *H01M 50/172* (2021.01)
  *H01M 50/183* (2021.01)
  *B23K 101/36* (2006.01)
  *H01M 50/103* (2021.01)
  *H01M 10/058* (2010.01)
  *B23K 26/03* (2006.01)
  *H01M 10/28* (2006.01)
  *B23K 26/32* (2014.01)
  *H01M 10/34* (2006.01)
  *B23K 103/10* (2006.01)

(52) U.S. Cl.
  CPC ....... *H01M 50/169* (2021.01); *H01M 50/172* (2021.01); *H01M 50/183* (2021.01); *B23K 2101/36* (2018.08); *B23K 2103/10* (2018.08); *H01M 10/058* (2013.01); *H01M 10/345* (2013.01); *H01M 50/103* (2021.01)

(56) References Cited

FOREIGN PATENT DOCUMENTS

| JP | 2010-238404 A |   | 10/2010 |
|----|---------------|---|---------|
| JP | 2010238404 A  | * | 10/2010 |
| JP | 2015-188901 A |   | 11/2015 |
| JP | 2015188901 A  | * | 11/2015 |

OTHER PUBLICATIONS

Machine translation of JP-09007557-A, Saito et al. (Year: 1997).*
Machine translation of JP-2015188901-A, Saito Shigeki et al. (Year: 2015).*

* cited by examiner

BATTERY CASE SEALING METHOD AND A SEALED BATTERY MANUFACTURING METHOD

INCORPORATION BY REFERENCE

The disclosure of Japanese Patent Application No. 2017-002680 filed on Jan. 11, 2017 including the specification, drawings and abstract is incorporated herein by reference in its entirety.

BACKGROUND

1. Technical Field

The disclosure relates to a battery case sealing method of sealing a battery case and to a sealed battery manufacturing method of manufacturing a sealed battery. Specifically, the disclosure relates to a method of joining together a peripheral edge of a side wall forming an opening of a battery case housing an electrode body and so on and a lid by laser welding to seal the opening of the battery case, and to a method of manufacturing a sealed battery, that includes the above-described sealing method as a process of sealing the opening of the battery case.

2. Description of Related Art

In recent years, the importance of high-potential, high-capacity secondary batteries has been increasing as in-vehicle power supplies and power supplies of personal computers, mobile terminals, and so on. In particular, it is expected that sealed batteries such as lithium-ion secondary batteries, nickel-metal hydride batteries that are lightweight and can provide high energy density will spread more and more as in-vehicle high-output power supplies. Typically, this type of sealed battery is formed by housing an electrode body, having a predetermined composition that is determined according to the type of battery, into a battery case formed in a predetermined shape from its opening, disposing a lid in the opening of the battery case, and welding a boundary portion between the lid and the battery case to seal the opening. For example, Japanese Patent Application Publication No. 11-077347 (JP 11-077347 A) discloses a prior art of a laser welding method that places a lid in an opening of a battery case (outer can case) and then irradiates a laser beam to a boundary portion between a peripheral edge of a side wall forming the opening of the battery case and the lid for welding. Japanese Patent Application Publication No. 2015-188901 (JP 2015-188901 A) discloses one example of a laser welding apparatus that is suitable for such a laser welding method.

SUMMARY

As a problem that may arise when a lid is disposed in an opening of a battery case and a laser beam is irradiated to a boundary portion thereof to perform laser welding, it can be cited that since the battery case and the lid forming the boundary portion are respectively formed of relatively thin metal members, a weld defect tends to occur. For example, the following are given as unwanted weld defects that may occur when the laser welding is performed. (A) Spatter that is generated during welding enters the battery case. The spatter is molten metal particles or the like that are scattered during welding. (B) Vacancies called voids or blowholes remain in a melted portion during welding so that a remaining material portion melted by welding decreases in amount. Hereinafter, the remaining material portion melted by welding is referred to as a "remaining molten material." (C) An unwelded portion that is not melted remains in the boundary portion between the peripheral edge of the side wall forming the opening of the battery case and the lid, and as a result, a remaining molten material extremely decreases in amount.

As a major cause for the occurrence of those weld defects, a failure of an assembled state between the battery case and the lid can be cited. For example, a through-hole is formed between the peripheral edge of the side wall forming the opening of the battery case and the lid due to an assembly failure between the battery case and the lid, so that the weld defect (A) or (C) is likely to occur. There is also a possibility of the occurrence of the weld defect (B) due to entrapment of air in the through-hole between the peripheral edge of the side wall forming the opening of the battery case and the lid. Therefore, the disclosure provides a method of sealing an opening of a battery case with a lid by laser welding that does not generate any of the weld defects described above. Further, the disclosure provides a method of manufacturing a sealed battery, which is characterized by sealing the opening of the battery case with the lid by the sealing method disclosed herein.

A first aspect of the disclosure relates to a battery case sealing method. The battery case sealing method is a method that, in a sealed battery including a battery case including a rectangular parallelepiped shape and a rectangular opening, a lid including a rectangular plate shape that corresponds to a shape of the opening, and an electrode body that is housed in the battery case, seals the opening of the battery case with the lid. The lid is fitted to the opening of the battery case. In a state where the lid is fitted to the opening, a side wall on an inner side of the battery case and a side surface of the lid are brought into contact with each other, the side wall forming the opening. In a state where the side wall on the inner side of the battery case is in contact with the side surface of the lid, a boundary portion between the side wall and the side surface of the lid is welded by irradiating a laser beam in a direction from an outer side of the battery case toward the inner side of the battery case in a thickness direction of the lid.

In the first aspect of the disclosure, the side wall on the inner side of the battery case may include a first portion that is close to an edge portion of a first surface of the lid, and the first surface may be located on the inner side of the battery case. When bringing the side wall on the inner side of the battery case and the side surface of the lid into contact with each other, the first portion may be brought into contact with the edge portion.

In the first aspect of the disclosure, the side wall on the inner side of the battery case may include a second portion, and the second portion may be closer to the opening than the first portion. When bringing the side wall on the inner side of the battery case and the side surface of the lid into contact with each other, the second portion may be bent, with the edge portion serving as a fulcrum, toward the outer side of the battery case to a degree that forms a gap between the second portion and the lid.

In the first aspect of the disclosure, the side wall on the outer side of the battery case may include a third portion that is more spaced apart from the opening than the first portion in the thickness direction of the lid. When bringing the side wall on the inner side of the battery case and the side surface of the lid into contact with each other, the third portion may be pressed from the outer side of the battery case toward the inner side of the battery case, and the first portion may be pressed to the edge portion.

In the first aspect of the disclosure, in a state where the first portion is pressed to the edge portion, the boundary portion between the side wall and the side surface of the lid may be welded.

In the first aspect of the disclosure, when fitting the lid to the opening of the battery case, the electrode body may be housed in the battery case.

The degree of a pressing force in this event is such that, as described above, the case side wall close to the edge portion of the case inner-side surface (first surface) of the lid, i.e. close to the edge portion of the case inner-side surface of the fitted lid, can abut against the edge portion, and further, with the edge portion serving as the fulcrum, the case side wall portion (second portion) closer to the opening than the portion (first portion) that may be pressed against the edge portion can be bent toward the outer side of the battery case, in other words, the case side wall can be warped outward to slightly expand the case opening, thereby forming the gap between the side wall and the lid. Consequently, it is possible to prevent the occurrence of any of the above-described weld defects when laser-welding the boundary portion between the case side wall and the lid around the opening and thus to perform sealing by excellent welding.

Specifically, since the battery case sealing method disclosed herein allows the edge portion of the case inner-side surface of the lid and the side wall of the battery case to securely abut against each other by a pressing force that is exerted from the outer side toward the inner side of the battery case, the abutting portion serves as a dam so that it is possible to prevent metal foreign matter (spatter) generated during laser welding from entering the battery case. Consequently, it is possible to prevent the occurrence of the above-described weld defect (A) and thus to improve the quality of welding. Further, according to the battery case sealing method disclosed herein, since the gap is formed between the side wall on the inner side of the battery case and the side surface of the lid by the pressing before welding, the gap serves as an air pocket so that air bubbles generated in a melted portion during laser welding are released to the gap (air pocket) outside the melted portion. Consequently, the remaining of voids or blowholes decreases so that it is possible to form a sufficient amount of a remaining molten material. Accordingly, it is possible to prevent the occurrence of the above-described weld defect (B) and thus to improve the quality of welding. Further, according to the battery case sealing method disclosed herein, a laser beam can be irradiated into the gap formed between the side wall on the inner side of the battery case and the side surface of the lid. Therefore, the laser beam can be directly irradiated to surfaces, facing each other, of the case side wall and the lid, i.e. the facing surfaces thereof, in the boundary portion, so that metal oxide films formed at these facing surfaces, for example, aluminum oxide films when the battery case and the lid are made of aluminum, can be effectively melted by high-temperature laser irradiation heat to form a sufficient amount of a melted portion in the boundary portion. Consequently, it is possible to suppress a decrease in the amount of a remaining molten material due to the remaining of an unwelded portion that is not melted in the boundary portion. Accordingly, it is possible to prevent the occurrence of the above-described weld defect (C) and thus to improve the quality of welding.

In the first aspect of the disclosure, the lid may include a second surface on the outer side of the battery case. When bringing the side wall on the inner side of the battery case and the side surface of the lid into contact with each other, a member may be disposed on the second surface for restricting a change in attitude of the lid. According to the battery case sealing method of this aspect, even when the outer surface of the case side wall is pressed with a relatively high pressing force, it is possible to suppress that the disposed position or attitude of the lid is changed due to such a pressing force. Therefore, the lid disposed in the case opening can be satisfactorily maintained in a preset fitting state. Consequently, excellent laser welding can be accurately performed.

In the first aspect of the disclosure, the side wall on the inner side of the battery case may include a second portion that is closer to the opening than the first portion. The second portion may be deformed toward the outer side of the battery case such that an opening area of the opening is greater than an area of the first surface. In the battery case sealing method of this aspect, the second portion, closer to the opening than the first portion that is pressed against the edge portion, of the side wall of the battery case is bent (warped) in advance outward of the battery case. Consequently, even with a relatively small pressing force, the side wall portion close to the edge portion of the case inner-side surface of the lid can be pressed to abut against the edge portion, and further, a satisfactory gap can be formed between the side wall portion, closer to the opening than the side wall portion that is pressed against the edge portion, and the lid.

In the first aspect of the disclosure, the gap may be in a range of 0.1 mm to 0.3 mm.

In the first aspect of the disclosure, the side wall on the outer side of the battery case may include a fourth portion that is located on an opposite side of the side wall from the first portion. When pressing from the outer side of the battery case toward the inner side of the battery case, the third portion spaced apart from the fourth portion by a distance that is half or more of a thickness of the lid may be pressed.

In the first aspect of the disclosure, the battery case may include a plurality of the side walls. When pressing from the outer side of the battery case toward the inner side of the battery case, all the side walls may be pressed over entire lengths of the side walls.

A second aspect of the disclosure relates to a sealed battery manufacturing method. The sealed battery manufacturing method disclosed herein is a method of manufacturing a sealed battery including a battery case including a rectangular parallelepiped shape and a rectangular opening, a lid including a rectangular plate shape that corresponds to a shape of the opening, and an electrode body that is housed in the battery case. The electrode body is housed into the battery case. In a state where the electrode body is housed in the battery case, the opening of the battery case is sealed with the lid. The sealing is performed by the battery case sealing method according to any one of the aspects disclosed herein. According to the sealed battery manufacturing method of this configuration, since the opening of the battery case is sealed satisfactorily, it is possible to provide the sealed battery with highly reliable sealability.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, a preferred embodiment of a battery case sealing method disclosed herein will be described with reference to the drawings. In the following drawings, the same symbol may be assigned to members or portions that exhibit the same function, thereby omitting or simplifying duplicate description thereof. Dimensional relationships (length, width, thickness, etc.) in the respective figures do not necessarily reflect actual dimensional relationships. Matters necessary for carrying out the disclosure other than those specifically referred to in the description are understood to be matters of design for a person skilled in the art based on the prior art in this field.

Hereinbelow, a lithium-ion secondary battery will be described by way of example as a preferred embodiment of a sealed battery to which the battery case sealing method disclosed herein is applied, which, however, is not intended to limit the application object of the disclosure to such a battery. In the description, "battery" is a term that refers to electrical power storage devices in general that can provide electrical energy, and is a concept including a primary battery and a secondary battery. The term "secondary battery" refers to electrical power storage devices in general that are repeatedly chargeable and dischargeable, and includes a so-called storage battery such as a lithium-ion secondary battery, a nickel-metal hydride battery, or a nickel-cadmium battery, i.e. a chemical battery, and a capacitor such as an electric double-layer capacitor, i.e. a physical battery. The term "sealed battery" refers to a battery having a structure in which an opening of a battery case is sealed with a lid so that the airtightness inside the battery case is maintained at a desired level in normal use. The lid is also called a sealing plate.

Figure 1:
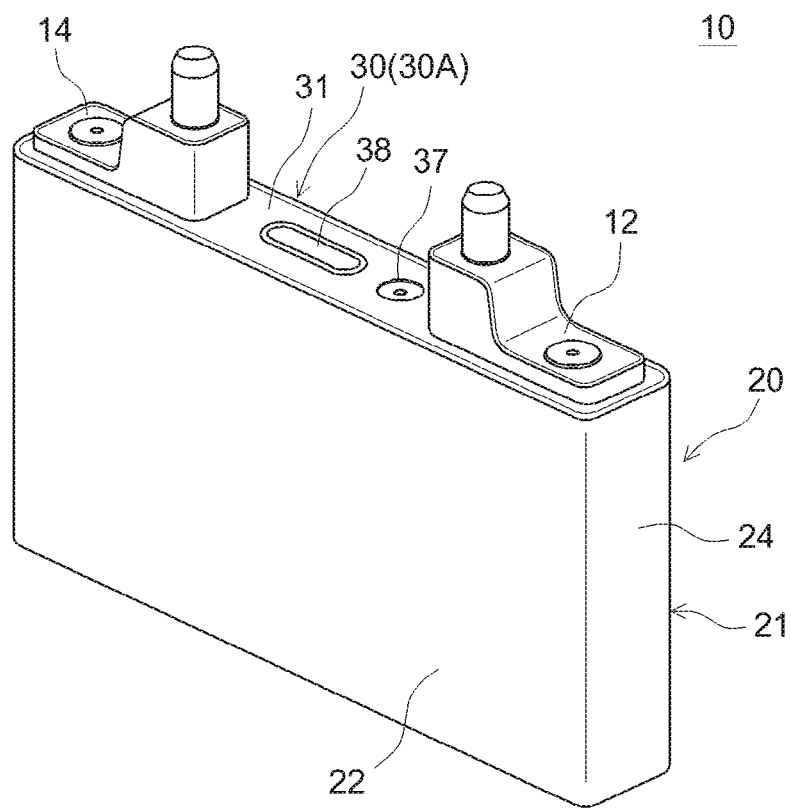
FIG. 1 is a perspective view schematically showing the external appearance of a sealed secondary battery according to an embodiment.

Before describing in detail an embodiment of a method of sealing an opening of a battery case, which is disclosed herein, one example of the configuration of a sealed battery to which such a method is applied will be first described with reference to the drawings. FIG. 1 is a perspective view schematically showing the external shape of a lithium-ion secondary battery 10 which will be described herein. As shown in FIG. 1, the lithium-ion secondary battery 10 according to this embodiment includes a flat rectangular parallelepiped housing 20 as an outer shell. The flat rectangular parallelepiped shape is also called a box shape. The housing 20 includes a battery case 21 having a bottomed rectangular parallelepiped shape in which one flat rectangular surface (an upper surface in FIG. 1) defines an opening 28, and a lid 30 having a rectangular plate shape which corresponds to the shape of the opening 28. The battery case 21 has a bottom surface and four side walls, i.e. two narrow short side walls 24 and two wide long side walls 22. The lid 30 is provided with a pouring port 37 for pouring a nonaqueous electrolyte solution, and a safety valve 38 for releasing gas inside the battery case 21 when the battery internal pressure has risen abnormally. The material forming the battery case 21 and the lid 30 is not particularly limited. For example, aluminum or an aluminum alloy mainly composed of aluminum is preferably used.

Figure 2:
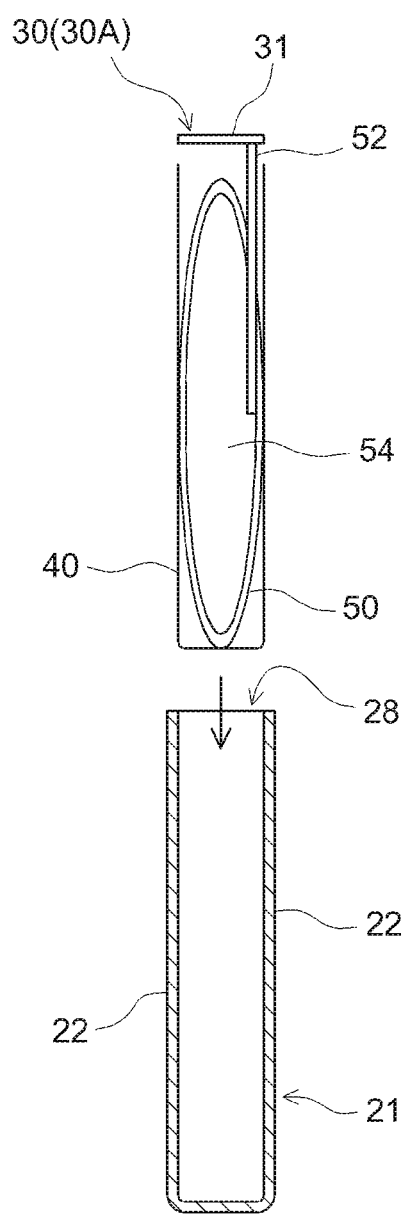
FIG. 2 is an explanatory diagram schematically showing in section a state of inserting an electrode body, integrated with a lid, into a battery case.

As shown in FIG. 1, in the lithium-ion secondary battery 10 according to this embodiment, the lid 30 is fitted (inserted) to the opening 28. Shelf-like lid stopping projections (not shown) are respectively formed on the inner surface sides of the two short side walls 24 of the battery case 21. With these lid stopping projections serving as barriers, the lid 30 is prevented from moving downward into the battery case 21 beyond a predetermined fitting position. Incidentally, "into the battery case 21" means "deeper from the opening 28". Since the formation of the lid stopping projections per se is the same as in this type of conventional battery case and thus does not characterize the disclosure, a further description thereof will not be given. As shown in FIG. 2, a pair of internal connection terminals 52 electrically connected respectively to a positive electrode 54 and a negative electrode (not shown) of an electrode body 50 are provided on a case inner-side surface 32 (first surface) of the lid 30. Only the positive electrode 54 side is shown in FIG. 2. As shown in FIG. 1, the internal connection terminals 52 are electrically connected respectively to a positive electrode external terminal 12 and a negative electrode external terminal 14 that are provided on a case outer-side surface 31 (second surface) of the lid 30. That is, the lid 30 according to this embodiment forms a lid subassembly 30A integrated with the electrode body 50. Since any of the electrode body 50, the terminal structures inside and outside the battery case 21, and the composition of the nonaqueous electrolyte solution, forming the lithium-ion secondary battery 10, does not characterize the disclosure, a further detailed description thereof will be omitted.

Figure 3A:
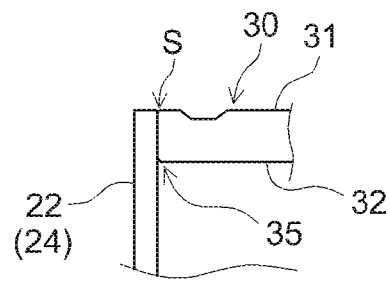
FIG. 3A is a diagram for explaining assembly between the lid and the battery case in a sealing method according to the embodiment.

Next, a method of sealing the opening 28 of the battery case 21 according to this embodiment and a welded portion of a boundary between an edge portion 35 of the lid 30 and the case side walls, which is formed by this sealing method, will be described with reference to the drawings. As shown in FIG. 2, first, the lid subassembly 30A formed as described above is attached to the battery case 21. Specifically, while inserting the electrode body 50, covered with an insulating film 40 in advance, into the battery case 21 from the opening 28, the lid 30 is fitted to the opening 28. FIG. 3A shows a fitted state between the lid 30 and the case side wall (the long side wall 22 or the short side wall 24). As described above, the lid stopping projections (not shown) provided on the inner surface sides of the short side walls 24 of the battery case 21 serve as barriers, so that the lid 30 is fitted to the opening 28 in a state where an upper end of the edge portion 35 is approximately flush with upper ends of the side walls 22 and 24.

Figure 3B:
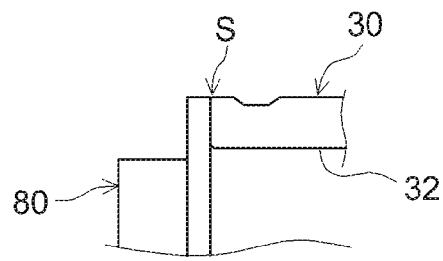
FIG. 3B is a diagram for explaining a pressing position of a side wall of the battery case in the sealing method according to the embodiment.
Figure 3C:
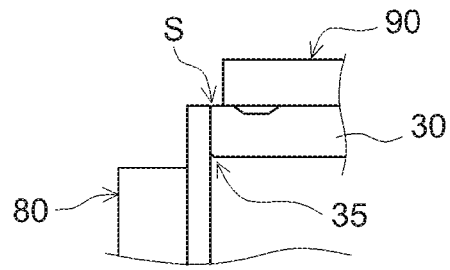
FIG. 3C is a diagram for explaining restriction of a change in the attitude of the lid in the sealing method according to the embodiment.
Figure 3D:
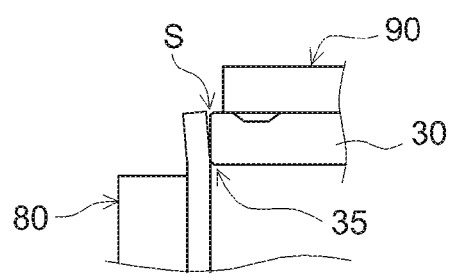
FIG. 3D is a diagram for explaining deformation (bending) of the side wall of the battery case due to pressing in the sealing method according to the embodiment.
Figure 4:
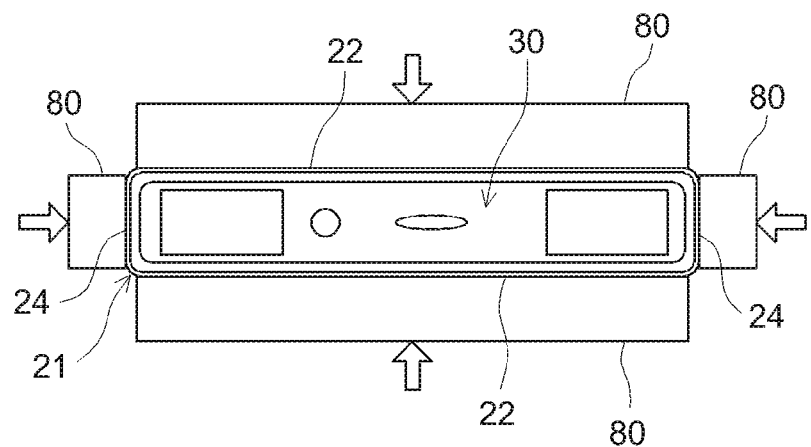
FIG. 4 is a plan view schematically showing one aspect of pressing the side walls of the battery case.

Then, as shown in FIG. 3B and FIG. 4, suitable pressing members such as clamps (clamps 80) are respectively disposed at portions (third portion), more spaced apart from the opening 28 than the case inner-side surface 32 of the lid 30 in a thickness direction of the lid 30, of outer surfaces of the four case side walls 22 and 24 forming the peripheral edge of the opening 28. In this event, as shown in FIG. 3C, a member (lid pressing member 90) for restricting a change in the attitude of the lid 30 at the fitting position may be disposed on the case outer-side surface 31 of the lid 30, thereby suppressing the attitude change of the lid 30. The attitude change of the lid 30 is, for example, lifting, inclination, or warping of the lid 30 at the fitting position. In this state, as shown in FIG. 3D, each of the side walls 22 and 24 of the battery case 21 is pressed inward (toward the inner side of the battery case 21) from outward (from the outer side of the battery case 21) by the clamp 80, so that, with the edge portion 35 of the case inner-side surface 32 of the lid 30 serving as a fulcrum, a portion (second portion), closer to the opening 28 than a portion (first portion) that is pressed against the edge portion 35 of the case inner-side surface 32 of the lid 30, of the case side wall 22, 24 is bent (warped) outward of the battery case 21 to a degree that forms a gap between the case side wall 22, 24 and the lid 30. In this event, it is important to apply a pressing force to a degree such that a portion, close to or facing the edge portion 35 of the case inner-side surface 32 of the lid 30, of the case side wall 22, 24 can be pressed to abut against such an edge portion 35.

Figure 3E:
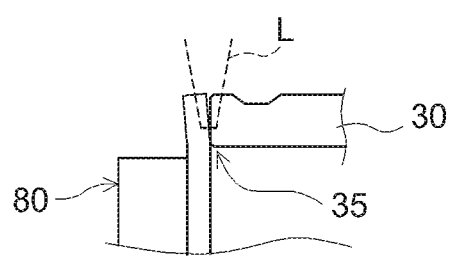
FIG. 3E is a diagram for explaining irradiation of a laser beam to a boundary portion between the lid and the side wall of the battery case in the sealing method according to the embodiment.
Figure 3F:
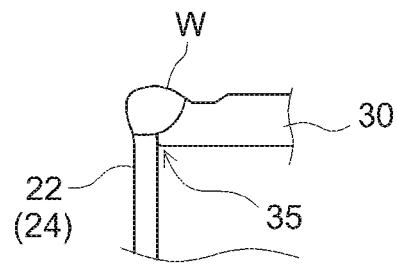
FIG. 3F is a diagram for explaining a state of a welded portion in the sealing method according to the embodiment.
Figure 5:
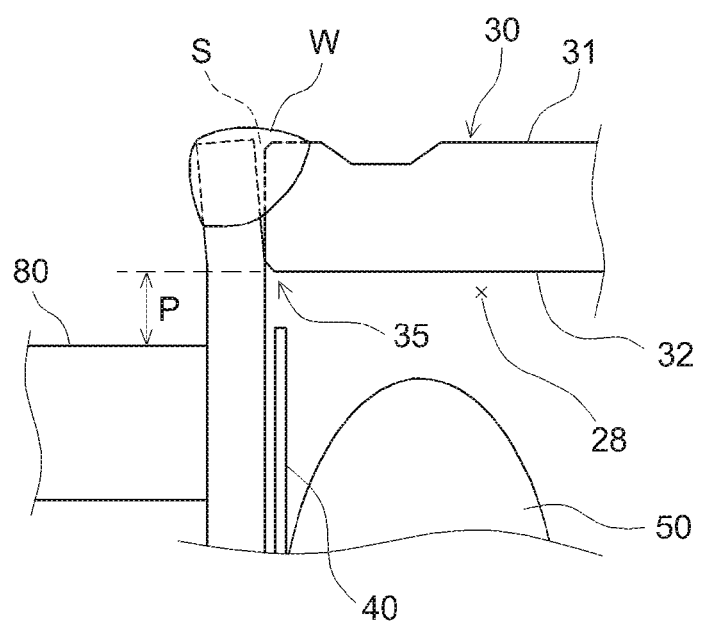
FIG. 5 is a sectional view schematically showing a welded portion formed in the sealing method according to the embodiment and the periphery thereof.

Then, as shown in FIG. 3E, laser welding is performed. Specifically, while maintaining the above-described pressed state, a laser beam is irradiated to a boundary portion S between the case side wall 22, 24 and the lid 30 where the gap is formed, i.e. irradiated to facing surfaces of both members, in a direction from the outer side toward the inner side of the battery case 21 in the thickness direction of the lid 30, i.e. from above the boundary portion S, thereby welding around the opening 28. By this process, the laser beam can be directly irradiated to the surfaces, facing each other, of the case side wall 22, 24 and the lid 30 in the boundary portion S, so that metal oxide films present at these portions can be effectively melted by high-temperature laser irradiation heat to form a sufficient amount of a melted portion in the boundary portion S. When, for example, the battery case 21 and the lid 30 are made of aluminum, the metal oxide films are aluminum oxide films. Consequently, it is possible to prevent an unwelded portion, that is not melted, from remaining in the boundary portion S and to prevent voids or blowholes from remaining in a melted portion, thereby suppressing a decrease in the amount of a remaining molten material to prevent the occurrence of a weld defect. Accordingly, as shown in FIG. 3F and FIG. 5, it is possible to form a high-quality welded portion W. Further, as shown in FIGS. 3D and 3E, in the laser welding according to this embodiment, since the case side wall 22, 24 is pressed to abut against the edge portion 35 at its portion close to or facing the edge portion 35, spatter that is generated during laser welding does not enter the battery case 21. Therefore, the high-quality welded portion W can be formed without damaging the electrode body 50 to seal the opening 28 of the battery case 21.

The outline of the sealing method according to this embodiment has been described with reference to the drawings. Next, several aspects for carrying out such a sealing method more preferably will be described. The position of the clamp 80 shown in FIG. 5 is not particularly limited as long as the portion, close to the edge portion 35 of the case inner-side surface 32 of the lid 30, of the case side wall 22, 24 can be pressed to abut against such an edge portion 35, and the portion, closer to the opening 28 than the abutting position, of the case side wall 22, 24 can be deformed to be bent (warped) outward of the battery case 21. For example, a distance P between the case inner-side surface 32 of the lid 30 and the clamp 80 shown in FIG. 5 is preferably set to a distance corresponding to half (50%) or more of the thickness of the lid 30, for example, a distance corresponding to 75 to 100% of the thickness of the lid 30. The distance P is corresponding to a distance between a fourth portion that is located on an opposite side of the side wall from the first portion and a third portion in the thickness direction of the lid. By providing the distance P of this degree, it is possible to satisfactorily achieve abutting of the portion, close to the edge portion 35, of the case side wall 22, 24 and bending (warping) of the portion, closer to the opening 28 than such a portion, of the case side wall 22, 24 outward of the battery case 21. Such deformation (bending) may be elastic deformation or plastic deformation according to the material of the battery case 21. The pressing force applied to the clamp 80 is the matter of design that should be changed as appropriate according to the material and thickness of the battery case 21. Although not particularly limited, in the case of an aluminum case having a thickness equal to or less than 1 mm, a pressing force of about 600N to 800N is preferable.

Figure 6:
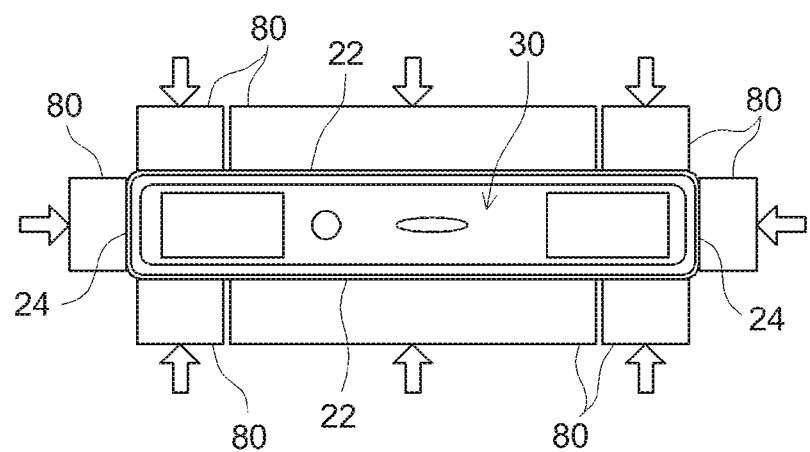
FIG. 6 is a plan view schematically showing another aspect of pressing the side walls of the battery case.

The pressing force may differ as appropriate depending on to what degree the gap is provided in the boundary portion S between the case side wall 22, 24 and the lid 30. For example, it is preferable to provide 0.1 mm or more as a gap suitable for laser welding. On the other hand, approximately 0.3 mm or less, particularly 0.2 mm or less, is preferable. By providing the gap within this range, the high-quality welded portion W that exhibits the above-described effects can be efficiently formed. As shown in FIG. 4, the clamps 80 are respectively disposed for the four side walls of the battery case 21, i.e. the two long side walls 22 and the two short side walls 24, and then the pressing is carried out as described above. In this event, it does not matter which of the long side walls 22 and the short side walls 24 the clamps 80 are first disposed for and which of the long side walls 22 and the short side walls 24 are first pressed. Further, the number of clamps 80 is not necessarily one for each side wall. As shown in FIG. 6, it is preferable to provide a plurality of clamps 80 particularly for each long side wall 22. This is because the side walls 22 and 24 around the opening 28 can be accurately pressed over their entire lengths without being affected by strain or bending that may be generated on the long side walls 22.

Figure 7:
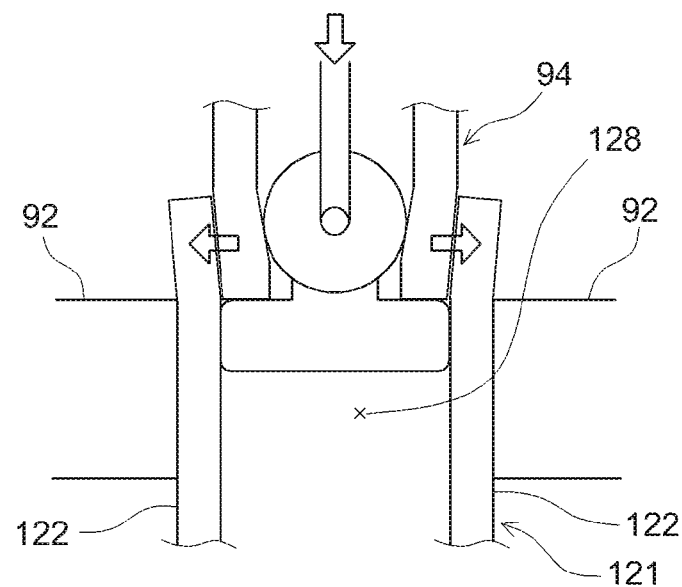
FIG. 7 is a diagram for schematically explaining one aspect of deforming (expanding) in advance portions, close to an opening, of side walls of a battery case.
Figure 8:
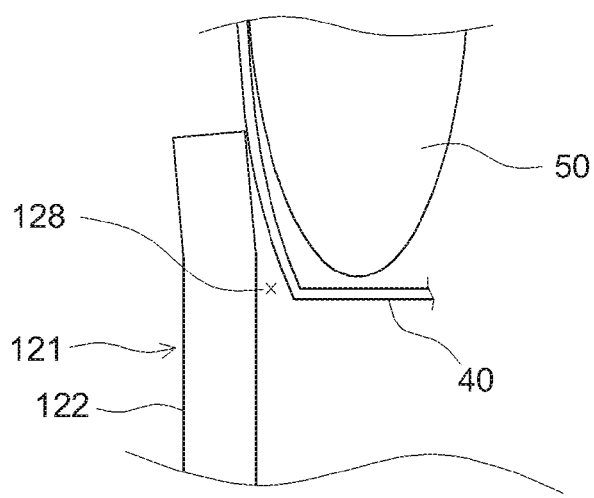
FIG. 8 is a diagram showing a state in which an electrode body is inserted from the opening of the battery case whose portions close to the opening are deformed (expanded) in advance.

It is also a preferred aspect that portions, close to the opening 28, of the side walls 22 and 24 of the battery case 21 are deformed in advance in a bending direction so as to cause the opening area of the opening 28 to be greater than the area of the case inner-side surface 32 of the lid 30 by such deformation. For example, as shown in FIG. 7, it is preferable that, using a suitable die 92 and a predetermined expanding jig 94, portions, close to an opening 128, of long side walls 122 of a battery case 121 to be used be deformed in advance outward of the battery case 121 to a desired degree. This deformation is plastic deformation. According to this aspect, even with a relatively small pressing force, side wall portions close to an edge portion 35 of a case inner-side surface 32 of a lid 30 can be pressed to abut against such an edge portion 35, and further, a satisfactory gap can be formed between side wall portions, closer to the opening 128 than the side wall portions that are pressed against such an edge portion 35, and the lid 30. Further, by expanding the opening 128 in this way, as shown in FIG. 8, when inserting an electrode body 50 into the battery case 121, the peripheral edge of the opening 128 is not likely to serve as a barrier, so that the electrode body 50 can be inserted into the battery case 121 more smoothly.

While the specific examples of the disclosure have been described above in detail, those are by way of example only. The disclosure includes various modifications or changes of the above-described specific examples. For example, when bringing the side walls on the inner side of the battery case, forming the opening, and the side surfaces of the lid into contact with each other, the pressing of the battery case is only one means, and instead, the lid may be moved to bring the side walls on the inner side of the battery case and the side surfaces of the lid into contact with each other. As described above, by employing the battery case sealing method disclosed herein, since the opening of the battery case is sealed satisfactorily, it is possible to provide the sealed battery with high reliability.

What is claimed is:

1. A battery case sealing method for sealing an opening of a battery case with a lid, the battery case having a rectangular shape and the opening having a rectangular shape, the lid having a rectangular plate shape that corresponds to the rectangular shape of the opening, and wherein an electrode body is housed in the battery case, comprising:
    fitting the lid to the opening of the battery case;
    in a state where the lid is fitted to the opening, bringing a side wall on an inner side of the battery case and a side surface of the lid into contact with each other, the side wall defining the opening, wherein the side wall on the inner side of the battery case includes a first portion that is brought into contact with an edge portion of a first surface of the lid, wherein the first surface of the lid is located on the inner side of the battery;
    when bringing the first portion of the battery case and the edge portion of the lid into contact with each other, pressing, with a lid pressing member, a second surface of the lid located on the outer side of the battery case in order to restrict a change in attitude of the lid with respect to the battery case;
    when bringing the first portion of the battery case and the edge portion of the lid into contact with each other, with the edge portion of the lid serving as a fulcrum, a second portion of the side wall is bent toward the outer side of the battery case to a degree that forms a gap between the second portion and the lid; and
    after forming the gap, welding a boundary portion between the side wall and the side surface of the lid by irradiating a laser beam into the gap, in a direction from an outer side of the battery case toward the inner side of the battery case in a thickness direction of the lid.

2. A battery case sealing method for sealing an opening of a battery case with a lid, the battery case having a rectangular shape and the opening having a rectangular shape, the lid having a rectangular plate shape that corresponds to the rectangular shape of the opening, and wherein an electrode body is housed in the battery case, comprising:
    fitting the lid to the opening of the battery case;
    in a state where the lid is fitted to the opening, bringing a side wall on an inner side of the battery case and a side surface of the lid into contact with each other, the side wall defining the opening, wherein the side wall on the inner side of the battery case includes a first portion that is brought into contact with an edge portion of a first surface of the lid, wherein the first surface of the lid is located on the inner side of the battery;
    wherein the side wall on the inner side of the battery case includes a second portion, and the second portion is closer to the opening than the first portion, and the side wall on the outer side of the battery case includes a third portion that is more spaced apart from the opening than the first portion in the thickness direction of the lid; and
    when bringing the side wall on the inner side of the battery case and the side surface of the lid into contact with each other, the third portion is pressed, by a pressing member located below the edge portion, from the outer side of the battery case toward the inner side of the battery case, with the edge portion of the lid serving as a fulcrum, so that the second portion of the side wall is bent toward the outer side of the battery case to a degree that forms a gap between the second portion and the lid; and
    after forming the gap, welding a boundary portion between the side wall and the side surface of the lid by irradiating a laser beam into the gap, in a direction from an outer side of the battery case toward the inner side of the battery case in a thickness direction of the lid.

3. The battery case sealing method according to claim 2, wherein:
    in a state where the first portion is pressed to the edge portion, the boundary portion between the side wall and the side surface of the lid is welded.

4. The battery case sealing method according to claim 3, wherein:
    when fitting the lid to the opening of the battery case, the electrode body is housed in the battery case.

5. The battery case sealing method according to claim 1, wherein:
    the second portion is deformed toward the outer side of the battery case such that an opening area of the opening is greater than an area of the first surface of the lid.

6. The battery case sealing method according to claim 1, wherein:
    the gap is in a range of 0.1 mm to 0.3 mm.

7. The battery case sealing method according to claim 2, wherein:
    the side wall on the outer side of the battery case includes a fourth portion that is located on an opposite side of the side wall from the first portion; and
    when pressing from the outer side of the battery case toward the inner side of the battery case, the third portion spaced apart from the fourth portion by a distance that is half or more of the thickness of the lid is pressed.

8. The battery case sealing method according to claim 2, wherein:

the battery case includes a plurality of the side walls; and when pressing from the outer side of the battery case toward the inner side of the battery case, all the side walls are pressed over entire lengths of the side walls.

9. The battery case sealing method according to claim 1, further comprising inserting the electrode body into the battery case before fitting the lid to the opening of the battery case.

10. The battery case sealing method according to claim 1, further comprising:

using a pressing member to press the outer side of the side wall of the battery case when the inner side of the side wall and the side surface of the lid are in contact with each other, thereby causing the edge portion to serve as the fulcrum.

11. The battery case sealing method according to claim 10, wherein the pressing member is disposed at a third portion of the side wall that is located further away from the opening than the first portion.

12. The battery case sealing method according to claim 2, wherein:

the lid includes a second surface on the outer side of the battery case; and when pressing the outer side of the battery case by the pressing member, pressing the second surface of the lid in order to restrict a change in attitude of the lid with respect to the battery case.

* * * * *